US012810375B2

(12) United States Patent
Ashkar et al.

(10) Patent No.: US 12,810,375 B2
(45) Date of Patent: Nov. 24, 2026

(54) CONCURRENT PROCESSING OF COMMAND PARTITIONS USING GROUPS OF GRAPHICS CORES

(71) Applicants: ADVANCED MICRO DEVICES, INC., Santa Clara, CA (US); ATI TECHNOLOGIES ULC, Markham (CA)

(72) Inventors: Alexander Fuad Ashkar, Winter Park, FL (US); Guennadi Riguer, Markham (CA); Nishank Pathak, Orlando, FL (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 135 days.

(21) Appl. No.: 18/374,299

(22) Filed: Sep. 28, 2023

(65) Prior Publication Data

US 2025/0111461 A1 Apr. 3, 2025

(51) Int. Cl.
*G06T 1/20* (2006.01)

(52) U.S. Cl.
CPC .................................... *G06T 1/20* (2013.01)

(58) Field of Classification Search
CPC ........................................................ G06T 1/20
See application file for complete search history.

(56) References Cited

U.S. PATENT DOCUMENTS

| | | | | |
|---|---|---|---|---|
| 2011/0087860 | A1 | 4/2011 | Nickolls et al. | |
| 2018/0157471 | A1 | 6/2018 | Venkataramani et al. | |
| 2022/0058053 | A1* | 2/2022 | Andrei | G06N 3/08 |
| 2022/0284539 | A1 | 9/2022 | Nalluri et al. | |
| 2022/0358618 | A1 | 11/2022 | Vembu et al. | |
| 2023/0298125 | A1* | 9/2023 | Nalluri | G06F 9/5061 345/505 |
| 2023/0401130 | A1* | 12/2023 | Mehta | G06F 11/0721 |

FOREIGN PATENT DOCUMENTS

KR 10-2013-0080663 7/2013

OTHER PUBLICATIONS

International Search Report and Written Opinion issued in Application No. PCT/US2024/034131, mailed Oct. 11, 2024, 10 pages.

* cited by examiner

*Primary Examiner* — Kent W Chang

(57) ABSTRACT

A processing system includes two or more graphics cores each disposed on respective dies and configured for concurrent processing of command packets. To this end, the processing system is configured to determine two or more command partitions associated with a command packet and to assign each command partition to a graphics core. Each graphics core then executes the same command packet by only performing instructions of the command packet associated with the command partitions assigned to the graphics core. Further, after executing an instructions of the command packet based on one or more assigned partitions, each graphics core adjusts one or more counters used to synchronize the execution of the command packet across the graphics cores.

14 Claims, 8 Drawing Sheets

CONCURRENT PROCESSING OF COMMAND PARTITIONS USING GROUPS OF GRAPHICS CORES

BACKGROUND

When executing instructions for an application, some processing systems include multiple chiplets that together perform various operations based on the instructions issued from the application. To distribute these instructions to the chiplets, the processing systems include a central command processor bridged across the chiplets and configured to receive command packets from a command queue. Based on these command packets, the central command processor issues respective instructions to each chiplet. However, distributing the instructions to the chiplets in this way increases the likelihood that clock domain crossing or voltage domain crossing occurs when signals from the central command processor are provided across the bus. Due to the likelihood of such clock domain crossing and voltage domain crossing, the processing system includes circuitry to help mitigate or prevent the clock domain crossing and voltage domain crossing. However, this circuitry increases the complexity of the processing system and introduces extra processing to provide the instructions to the chiplets, which reduces the processing efficiency of the system. Further, increasing the number of chiplets supported by the central command processor increases the likelihood of introducing bottlenecks while the instructions are issued and performed, negatively impacting the efficiency of the processing system and limiting the scalability of the processing system.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
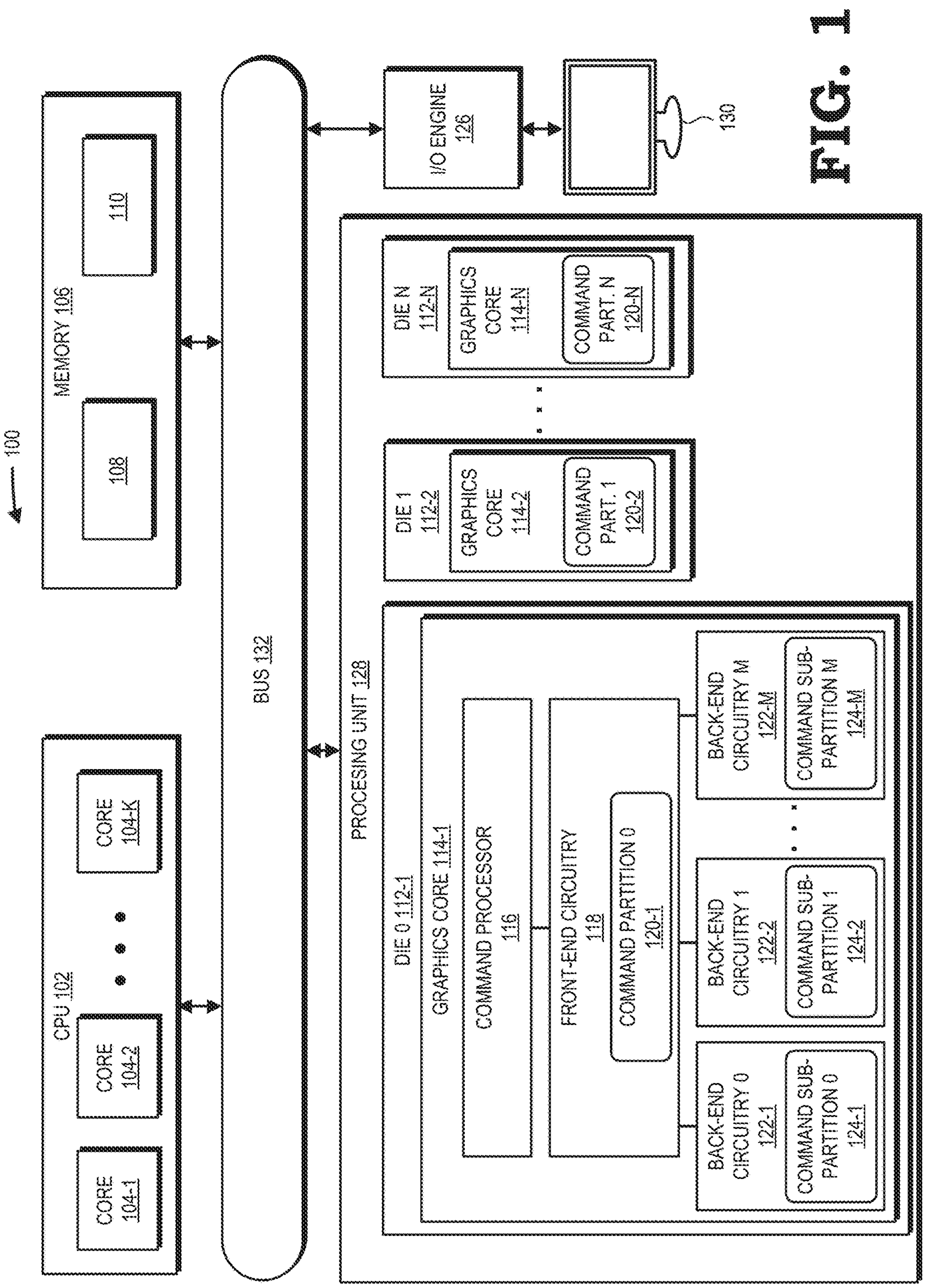
FIG. 1 is a block diagram of a processing system configured for concurrent processing of command partitions by a group of graphics cores, in accordance with some embodiments.

Techniques and systems described herein address improving the performance efficiency of a processing unit executing commands from one or more command packets. To this end, a processing system includes a processing unit including two or more graphics cores. Each graphics core is disposed on a respective die such that each graphics core in the group is disposed on its own distinct die. Additionally, each graphics core includes a respective command processor and front-end circuitry configured to support one or more instances of back-end circuitry. To execute a command packet, the command processor of each graphics core is configured to receive a command packet indicating one or more commands, instructions, draw calls, or any combination thereof to be performed for one or more compute applications, graphics applications, or both. Based on the received command packet, the command processor of each graphics core provides one or more commands, instructions, draw calls, or any combination thereof indicated in the command packet to the front-end circuitry of the graphics core. The front-end circuitry of a graphics core then performs one or more commands, instructions, draw calls, or any combination thereof provided by the command processor, determines one or more commands, instructions, draw calls, or any combination thereof to provide to one or more instances of back-end circuitry, or both. As an example, the front-end circuitry performs vector shading operations, primitive assembly operations, or both based on draw calls indicated in the command packet to determine a set of primitives. From the determined set of primitives, the front-end circuitry determines groups of draw calls, primitives, groups of primitives, or any combination thereof to be handled by one or more respective instances of back-end circuitry of the graphics core supported by the front-end circuitry. The front-end circuitry then provides instructions, commands, draw calls, or both associated with the determined groups of draw calls, primitives, groups of primitives, or any combination thereof to the respective instances of back-end circuitry. The instances of back-end circuitry then perform the instructions and commands provided by the front-end circuitry to, for example, render primitives to produce one or more graphics objects and store the rendered primitives in a frame buffer.

To help improve the performance efficiency for performing the commands, instructions, and draw calls indicated in a command buffer, the processing system is configured to first divide the commands, instructions, draw calls, or any combination thereof indicated in a command packet into two or more command partitions. The processing system is then configured to assign one or more of the command partitions to a respective graphics core of the processing system. Based on the command partitions assigned to a graphics core, the graphics core is configured to perform the commands, instructions, and draw calls indicated in a received command packet. As an example, the processing system first divides a command packet into two or more partitions with each partition including one or more distinct work blocks of the command packet. The processing system then assigns each partition of the command packet to a corresponding graphics core. That is to say, the processing system assigns one or more partitions of the command packet to respective graphics cores. A command packet buffer then provides the command packet to each graphics core. After receiving the command packet, a graphics core determines whether a command or instruction indicated in the command packet is within a partition of the command packet assigned to the graphics core. Based on the command or instruction being within the partition of the command packet assigned to the graphics core, the graphics core performs the command or instruction. Further, based on the command or instruction not being within the partition of the command packet assigned to the graphics core, the graphics core does not perform the command or instruction.

As another example, the processing system partitions a screen space into two or more partitions. Each partition of the screen space represents one or more pixels of the screen space in a first direction and one or more pixels of the screen space in a second direction. After dividing the screen into two or more partitions, each partition is assigned to a respective graphics core of the processing unit. To render graphics objects for a scene within the screen space, a command packet buffer first supplies the command packet to each graphics core in a group of graphics cores. Based on the received graphics operation packet, the respective command processor of each graphics core within the group of graphics cores provides the same set of draw calls to a corresponding front-end circuitry. After receiving the draw calls, a front-end circuitry of each graphics core then determines whether each primitive indicated in each received draw call is at least partially within the respective partition of the screen space assigned to the graphics core. For example, the front-end circuitry of a graphics core determines the position of the primitives indicated by the draw calls. The front-end circuitry then compares the determined location of the primitives to the location of the partition of the screen space assigned to the graphic core to determine whether one or more primitives are at least partially within the respective partition of the screen space. Based on the primitives at least partially within the respective partition of the screen space, the front-end circuitry determines a set of primitives, groups of primitives, draw calls, or any combination thereof to be performed by the graphics core. The front-end circuitry then provides instructions, commands, or both associated with the set of primitives, groups of primitives, draw calls, or any combination thereof to be performed to one or more instances of back-end circuitry. In response to receiving one or more instructions or commands from the front-end circuitry, the instances of back-end circuitry render one or more primitives, groups of primitives, or both and store them in a frame buffer.

In this way, each graphics core within the group of graphics cores works to perform commands and instructions within its assigned command partition in response to receiving the command packet without communicating with other graphics cores. Because each graphics core is able to perform commands and instructions only within its assigned command partition without communicating with other graphics cores, the processing burden on each graphics core is reduced, improving the processing efficiency of the system. Additionally, because the graphics cores do not need to communicate with one another to perform the instructions and commands in a command packet, the number of connections needed between the graphics cores is reduced, which reduces the footprint of the processing system.

To help synchronize the execution of the command packet across the graphics core, each graphics core includes a synchronization circuitry configured to help maintain a set of counters. The set of counters, for example, tracks the respective number of times each of one or more graphics cores has observed one or more instructions, commands, or draw calls indicated in a command packet. For example, the counters track the respective number of times each graphics core has observed one or more certain types of instructions, commands, draw calls, or any combination thereof indicated in the command packet. Within some processing systems, each graphics core includes or is otherwise connected to counters configured to track the respective number of times each graphics core has observed one or more certain types of instructions, commands, draw calls, or any combination thereof while other processing systems include a centralized set of counters configured to track the respective number of times each graphics core has observed one or more certain types of instructions, commands, draw calls, or any combination thereof. While performing a command packet, the synchronization circuitry of each graphics core is configured to adjust one or more counters. For example, based on a graphics core performing one or more instructions, commands, draw calls, or any combination thereof indicated in a command packet, the synchronization circuitry of the graphics core is configured to increment one or more counters indicating the number of times the graphics core has observed the instruction, command, or draw call. As another example, based on a graphics core determining that an instruction, command, draw call, or any combination thereof indicated in a command packet is not associated with the command partition assigned to the graphics core, the synchronization circuitry of the graphics core is configured to increment one or more counters indicating the number of times the graphics core has observed the instruction, command, or draw call.

When synchronization is required across two or more graphics cores, the synchronization circuitry of each graphics core checks one or more counters to determine whether each graphics core has observed the same number of certain instructions, commands, draw calls, or any combination thereof indicated in the command packet. As an example, based on the command packet indicating synchronization is required across two or more graphics cores, a graphics core begins to idle and the synchronization circuitry of the graphics core queries one or more counters to determine if two or more graphics cores have observed the same number of certain instructions, commands, draw calls, or any combination thereof. Based on the counters indicating that the graphics cores have not observed the same number of certain instructions, commands, draw calls, or any combination thereof, the graphics core continues to idle. Based on the counters indicating that the graphics cores have observed the same number of certain instructions, commands, draw calls, or any combination thereof, the graphics core performs the next command, instruction, or draw call indicated in the command packet. In this way, the graphics cores are synchronized while performing the command packet with minimal communication between the graphics cores, which helps reduce the number of connections needed between the graphics cores. Due to the number of connections being reduced, the footprint of the processing system is also reduced.

Referring now to FIG. 1, a processing system 100 configured for concurrent processing of command partitions is presented, according to some implementations. The processing system 100 includes or has access to a memory 106 or other storage component implemented using a non-transitory computer-readable medium, for example, a dynamic random-access memory (DRAM). However, in implementations, the memory 106 is implemented using other types of memory including, for example, static random-access memory (SRAM), nonvolatile RAM, and the like. According to implementations, the memory 106 includes an external memory implemented external to the processing units implemented in the processing system 100. The processing system 100 also includes a bus 132 to support communication between entities implemented in the processing system 100, such as the memory 106. Some implementations of the processing system 100 include other buses, bridges, switches, routers, and the like, which are not shown in FIG. 1 in the interest of clarity.

In embodiments, processing system 100 is configured to execute one or more applications 110. Such applications 110, for example, include compute applications, graphics applications, or both. A compute application, as an example, when executed by processing system 100, causes processing system 100 to perform one or more computations, for example, machine-learning computations, neural network computations, databasing computations, or the like. A graphics application, when executed by processing system 100, causes processing system 100 to render a scene including one or more graphics objects within a screen space and, for example, display them on a display 130. To execute one or more applications 110, processing system 100 includes processing unit 128. Processing unit 128, for example, includes one or more vector processors, coprocessors, graphics processing units (GPUs), general-purpose GPUs (GPGPUs), non-scalar processors, highly parallel processors, artificial intelligence (AI) processors, inference engines, machine learning processors, other multithreaded processing units, scalar processors, serial processors, or any combination thereof. In embodiments, processing unit 128 performs one or more commands, instructions, draw calls, or any combination thereof indicated in an application 110. For example, processing unit 128 performs one or more commands, instructions, draw calls, or any combination thereof so as to render images according to one or more graphics applications for presentation on a display 130. To this end, as an example, processing unit 128 renders graphics objects (e.g., groups of primitives) to produce values of pixels that are provided to the display 130 which uses the pixel values to display an image that represents the rendered graphics objects. In embodiments, commands indicated in an application 110 include, as an example, scheduling commands, wait commands, prediction commands, occlusion queries, pipeline status commands, stream output operation commands, acquire memory commands, release memory commands, end-of-pipe event commands, end-of-shader event commands, partial flush commands, or any combination thereof, to name a few.

To perform commands, instructions, draw calls, or any combination thereof for an application 110, processing unit 128 includes a number of dies 112 each including a respective graphics core 114. That is to say, each graphics core 114 of processing unit 128 is disposed on a respective die 112 such that each graphics core 114 is disposed on a different die 112. According to embodiments, the graphics cores 114 of processing unit 128 are configured to execute instructions, commands, and draw calls concurrently or in parallel. In embodiments, one or more graphics cores 114 include SIMD units that perform the same operation on different data sets. As an example, one or more graphics cores 114 include SIMD units that perform the same operation as indicated by one or more commands, instructions, or both from an application 110. Though the example, embodiment of FIG. 1 presents processing unit 128 as including three dies (112-1, 112-2, 112-N) representing an N number of dies each including a respective graphics core (114-1, 114-2, 114-N), in other embodiments, processing unit 128 may include any number of dies 112 each having a respective graphics core 114.

In some embodiments, each graphics core 114 of processing unit 128 includes or is otherwise connected to a command processor 116, front-end circuitry 118, and one or more instances of back-end circuitry 122. To perform one or more commands, instructions, or both for an application 110, a graphics core 114 first receives a command packet at the command processor 116 from, for example, bus 132. Such a command packet, for example, includes one or more commands, instructions, operations, draw calls, or any combination thereof to be performed for an application 110 as indicated by program code 108. As an example, for a compute application, the command packet includes one or more commands, instructions, operations, or any combination thereof that, when executed by a graphics core 114, cause the graphics core 114 to generate data (e.g., results) for one or more computations. As another example, for a graphics application, the command packet includes one or more draw calls to be performed for the graphics application. Each draw call, for example, indicates one or more instructions to render one or more primitives for a scene. Based on the received command packet, the command processor 116 of the graphics core 114 determines one or more commands, instructions, operations, draw calls, or any combination thereof to be performed by the graphics core 114. The command processor 116, for example, includes circuitry configured to receive and parse command packets and, based on the received command packets, issues instructions to the front-end circuitry 118. As an example, the command processor 116 determines and distributes to the front-end circuitry 118 one or more instructions representing the one or more draw calls indicated in a command packet. The front-end circuitry 118 of a graphics core 114, for example, is configured to perform one or more commands, instructions, or both provided by a command processor 116, distribute one or more commands or instructions to one or more instances of back-end circuitry 122, or both. For example, when performing a command packet from a compute application, front-end circuitry 118 is configured to perform one or more commands, instructions, operations, or any combination thereof as indicated by the command packet.

As another example, when performing a command packet from a graphics application, front-end circuitry 118 is configured to support one or more instances of back-end circuitry 122 by, for example, performing one or more vertex operations, shading operations, primitive assembly operations, primitive culling operations, or any combination thereof. To this end, front-end circuitry 118 first receives one or more draw calls as indicated by a received command packet from a command processor 116. Based on the draw calls, the front-end circuitry 118 then determines the location of one or more primitives within the scene. As an example, front-end circuitry 118 performs one or more vertex shader operations, primitive assembly operations, bounding box operations, frustum operations, or any combination thereof to determine the location of the primitives within the scene. Based on the determined primitives that are at least partially within the scene, the front-end circuitry 118 determines a set of primitives, groups of primitives (e.g., meshlets), or both to be rendered. Additionally, in some embodiments, front-end circuitry 118 is configured to perform one or more culling operations on the set of primitives, groups of primitives, or both to be rendered based on the location of the primitives within the scene. For example, front-end circuitry 118 is configured to cull one or more primitives, groups of primitives, or both based on the location of the primitive or sub-primitive, the depth of the primitive or sub-primitive, the visibility of the primitive or sub-primitive, or any combination thereof, to name a few. After determining the set of primitives, groups of primitives, or both to be rendered, front-end circuitry 118 provides one or more instructions indicating one or more primitives of the set of primitives, groups of primitives, or both to be rendered, location data (e.g., the location of the primitives or groups of primitives within the scene), or both to one or more instances of back-end circuitry 122.

An instance of back-end circuitry 122, for example, is configured to render one or more primitives or groups of primitives by performing one or more rasterization operations, fragment shader operations, geometry processing operations, vertex processing operations, or any combination thereof. For example, based on instructions indicating one or more primitives and location information for one or more primitives received from front-end circuitry 118, an instance of back-end circuitry 122 is configured to rasterize and render the primitives indicated by the instruction so as to produce one or more pixel values representing the primitives. After producing these pixel values, the instance of back-end circuitry 122 is configured to store the pixel values in a frame buffer. According to embodiments, the instances of back-end circuitry 122 of a graphics core 114 work concurrently and in parallel to render the primitives indicated in the draw calls provided from front-end circuitry 118 with each instance of back-end circuitry 122 performing at least a portion of commands, instructions, or both issued from the front-end circuitry 118. Though the example embodiment of FIG. 1 presents a graphics core 114 as including three instances of back-end circuitry (122-1, 122-2, 122-M) representing an M number of instances of back-end circuitry, in other embodiments, a graphics core 114 can include any number of instances of back-end circuitry 122. Further, each graphics core 114 may have its own respective number of instances of back-end circuitry 122 that is different from one or more other graphics cores 114. According to embodiments, each instance of back-end circuitry 122 is also configured to perform one or more instructions, operations, or both for one or more instructions of a compute application.

To help improve the performance efficiency for performing a command packet from an application 110, processing unit 128 is configured to divide the command packet into one or more command partitions 120. Each command partition 120, for example, represents at least a portion of the commands, instructions, draw calls, or any combination thereof within a command packet. For example, based on a command packet being issued from a compute application, processing unit 128 is configured to divide the command packet into two or more partitions each representing a command partition 120. As an example, processing unit 128 divides the command packet into two or more command partitions 120 each representing a respective number of distinct work blocks (e.g., one or more work items) associated with the command packet. After dividing the command packet into two or more command partitions 120, processing unit 128 assigns each command partition 120 to corresponding graphics cores 114. That is to say, processing unit 128 assigns one or more respective command partitions 120 to each graphics core 114 such that each graphics core 114 only performs the commands, instructions, or both in a command packet within the partition of the command packet (e.g., command partition 120) assigned to the graphics core 114. Referring to the example embodiment presented in FIG. 1, processing unit 128 assigns a first command partition 0 120-1 to a first graphics core 114-1, a second command partition 1 120-2 to a second graphics core 114-2, and a third command partition 120-N to a third graphics core 114-N.

As another example, based on a command packet being issued from a graphics application, processing unit 128 is configured to divide a screen space into two or more partitions with each partition of the screen space representing a command partition 120. Each partition of the screen space, for example, includes a first number of pixels in a first (e.g., horizontal) direction and a second number of pixels in a second (e.g., vertical direction). In embodiments, each partition of the screen space has the same size while in other embodiments one or more partitions of the screen space have a size that is different from the size of one or more other partitions of the screen space. After diving the screen space into two or more partitions, processing unit 128 then assigns each partition of the screen space (e.g., command partition 120) to a respective graphics core 114. That is to say, processing unit 128 assigns each partition of the screen space to respective graphics cores 114 such that each graphics core 114 only performs instructions, commands, draw calls, or any combination thereof of a command packet that indicates primitives, groups of primitives, or both within the partition of the screen space assigned to the graphics core 114. Additionally, in embodiments, processing unit 128 is configured to divide the screen space such that each partition of the screen space (e.g., command partition 120) includes one or more respective sub-partitions (e.g., command sub-partitions 124). For example, processing unit 128 is configured to assign each command sub-partition 124 of a command partition 120 to a respective instance of back-end circuitry 122 of the graphics core 114 assigned to the command partition 120. Referring to the example embodiment of FIG. 1, processing unit 128 assigns a command screen sub-partition 0 124-1 to a first instance of back-end circuitry 0 122-1 of graphics core 114, a second command sub-partition 1 124-2 to a second instance of back-end circuitry 1 122-2 of graphics core 114, and a third command sub-partition M 124-M to a third instance of back-end circuitry M 122-M of graphics core 114.

After processing unit 128 has assigned each command partition 120 to a respective graphics core 114, each graphics core 114 is configured to receive the same command packet and is configured to execute the command packet based on the command partitions 120 assigned to the graphics core 114. As an example, based on the command packet being from a compute application, the command processor 116 of each graphics core 114 first parses through the command packet and issues the same set of commands, instructions, or both to a respective front-end circuitry 118. As an example, the command processor 116 walks through the command packet and, based on the walk, issues commands, instructions, or both to a respective front-end circuitry 118. In response to receiving the commands, instructions, or both, the front-end circuitry 118 then determines if the commands, instructions, or both are within a command partition 120 assigned to the graphics core 114. That is to say, the front-end circuitry 118 determines whether the command or instruction issued from the command processor 116 is within a partition (e.g., the number of distinct work items) of the command packet assigned to the graphics core 114. Based on the command or instruction not being in a command partition 120 assigned to the graphics core 114, the front-end circuitry 118 does not execute the command or instruction. Based on the command or instruction being in a command partition 120 assigned to the graphics core 114, the front-end circuitry 118 executes the command or instruction, sends commands or instructions to respective instances of back-end circuitry 122, or both. In this way, graphics cores 114 are configured only to perform partitions of a command packet (e.g., command partition 120) assigned to the graphics core 114.

As another example, based on the command packet being from a graphics application, the command processor 116 of each graphics core 114 issues a same set of draw calls to a respective front-end circuitry 118. Based on the set of draw calls, the front-end circuitry 118 of a graphics core 114 is configured to determine whether one or more primitives, groups of primitives, or both indicated by the draw calls are at least partially within the partitions of the screen space (e.g., command partitions 120) assigned to the graphics core 114. For example, the front-end circuitry 118 performs one or more vertex shader operations, primitive assembly operations, bounding box operations, frustum operations, or any combination thereof to determine whether each primitive, sub-primitive, or both indicated in the draw calls is at least partially within the partition of the screen space assigned to the graphics core 114. Based on which primitives, groups of primitives, or both are at least partially within the command partition 120 assigned to a respective graphics core 114, the front-end circuitry 118 determines respective sets of instructions, commands, draw calls, or any combination thereof to issue to the instances of back-end circuitry 122. As an example, for each primitive, sub-primitive, or both determined to be at least within the command partition 120 assigned to the graphics core 114, the front-end circuitry 118 determines a set of instructions, commands, draw calls, or any combination thereof indicating the primitives, groups of primitives, or both. In this way, the instructions, commands, draw calls, or any combination thereof issued by the front-end circuitry 118 only includes instructions, commands or draw calls indicating one or more primitives or groups of primitives at least partially within the command partition 120 assigned to the graphics core 114. As such each graphics core 114 is configured to concurrently perform the command packet without needing to communicate with other graphics cores 114 for the purpose of executing one or more commands. Because each graphics core 114 is able to perform only instructions and commands within its assigned command partition 120 without communicating with other graphics cores 114, the processing burden on each graphics core 114 is reduced, improving the processing efficiency of processing system 100. Additionally, because the graphics cores 114 do not need to communicate with one another to execute the commands, the number of connections needed between the graphics cores 114 is reduced, which reduces the footprint of the processing system.

Once the front-end circuitry 118 has determined whether each primitive, sub-primitive, or both are at least partially within the command partition 120 assigned to a respective graphics core 114, the front-end circuitry 118 provides the set of instructions, commands, draw calls, or any combination thereof to the instances of back-end circuitry 122 of the graphics core 114. For example, in some embodiments, the front-end circuitry 118 is configured to provide the instructions, commands, draw calls, or any combination thereof to each instance of back-end circuitry 122 based on the corresponding command sub-partition 124 assigned to the instance of back-end circuitry 122. As an example, the front-end circuitry 118 is configured to determine whether the primitives, groups of primitives, or both indicated in the draw calls received from a command processor 116, indicated by the determined set of instructions, commands, draw calls, or any combination thereof, or both are at least partially within the command sub-partitions 124 (e.g., sub-partitions of the screen space) assigned to the instances of back-end circuitry 122. Based on at least a portion of a primitive or sub-primitive being within a command sub-partition 124, the front-end circuitry 118 provides an instruction, command, or draw call indicating the primitive or sub-primitive to the respective instance of back-end circuitry 122 assigned to the command sub-partition 124. In response to receiving the instructions command, or draw call from front-end circuitry 118, an instance of back-end circuitry 122 then performs one or more rasterization operations, fragment shader operations, geometry processing operations, vertex processing operations, or any combination thereof so as to render one or more primitives or groups of primitives. The instance of back-end circuitry 122 then stores the rendered primitives or groups of primitives in a frame buffer. By assigning each graphics core 114 a respective command partition 120 in this way, each graphics core 114 works to render primitives within its assigned command partition 120 in response to receiving the same command packet.

According to some embodiments, processing system 100 is configured to synchronize the execution of a command packet between two or more graphics cores 114 of processing unit 128. To this end, in embodiments, processing system 100 includes sets of counters configured to track the respective number of times each graphics core 114 has observed one or more corresponding commands, instructions, draw calls, pipeline events (e.g., one or more certain points in a compute pipeline or graphics pipeline), or any combination thereof of a command packet. As an example, a set of counters includes a first counter that keeps track of the number of times a first graphics core 114-1 has observed certain commands, instructions, draw calls, or any combination thereof, a second counter that keeps track of the number of times a second graphics core 114-2 has observed the certain commands, instructions, draw calls, or any combination thereof, and a third counter that keeps track of the number of time a third graphics core 114-N has observed the certain commands, instructions, draw calls, or any combination thereof. As another example, a set of counters includes a first count configured to track the number of times an associated graphics core 114 has observed a first command and a second counter configured to track the number of times the associated graphics core 114 has observed a second command that is different from the first command. In some embodiments, the sets of counters are localized with each graphics core 114 maintaining corresponding sets of counters representing the respective number of times each graphics core 114 has observed certain commands, instructions, draw calls, or any combination thereof. In other embodiments, the sets of counters are globalized within processing system 100, with each graphics core 114 interacting with the counters via a synchronization management circuitry.

To maintain the counters, each graphics core 114 includes a synchronization circuitry (not shown for clarity) configured to adjust (e.g., increment, reduce) the counters based on the execution of a command packet. For example, based on a graphics core 114 performing one or more instructions, commands, draw calls, or any combination thereof indicated by a command packet, the synchronization circuitry increments one or more counters indicating the number of times the graphics core 114 has observed the instructions, commands, draw calls, or any combination thereof indicated by the command packet. Additionally, based on the front-end circuitry 118 of a graphics core 114 determining an instruction, command, draw call, or any combination thereof indicated by a command packet is not associated with the command partition 120 assigned to the graphics core 114, the synchronization circuitry adjusts one or more counters indicating the number of times the graphics core 114 has observed the instruction, command, draw call, or any combination thereof indicated by the command packet. In this way, each graphics core 114 is configured to maintain a count of the number of times the graphics core 114 has observed certain instructions, commands, draw calls, or any combination thereof indicated by a command packet.

In embodiments, one or more command packets include one or more synchronization commands. Such synchronization commands, for example, include instructions for a graphics core 114 to wait until one or more other graphics core 114 of the processing unit 128 are at the same point in a pipeline (e.g., compute pipeline, graphics pipeline) indicated by the command packet. That is to say, instructions for a graphics core 114 to wait until one or more other graphics core 114 of the processing unit 128 have completed the same number of one or more certain commands, instructions, draw calls, or any combination thereof as the graphics core 114. When executing the synchronization commands, a graphics core 114 suspends execution of the command packet and queries one or more counters to determine the number of times each graphics core 114 has observed one or more certain commands, instructions, draw calls, or any combination thereof. Based on the counters indicating that the graphics cores 114 have not yet each observed the same number of one or more certain commands, instructions, draw calls, or any combination thereof, the graphics core 114 continues to suspend execution of the command packet. Based on the counters indicating that the graphics cores 114 have each observed the same number of one or more certain commands, instructions, draw calls, or any combination thereof, the graphics core 114 performs the next command, instruction, draw call, or any combination thereof indicated by the command packet. In this way, the processing system 100 is configured to maintain unified counters for one or more pipelines (e.g., compute pipelines, graphics pipelines) being executed by the graphics cores 114. Due to these unified counters, the processing system 100 is enabled to synchronize the execution of a command packet between the graphics cores 114 with minimal communication between the graphics cores 114. Because the communication between the graphics cores 114 is kept to a minimum, the number of connections needed between the graphics cores 114 is reduced, which reduces the footprint of the processing system.

The processing system 100 also includes a central processing unit (CPU) 102 that is connected to the bus 132 and therefore communicates with processing unit 128 and the memory 106 via the bus 132. The CPU 102 implements a plurality of processor cores 104-1 to 104-N that execute instructions concurrently or in parallel. In implementations, one or more of the processor cores 104 operate as SIMD units that perform the same operation on different data sets. Though in the example implementation illustrated in FIG. 1, three processor cores (104-1, 104-2, 104-K) are presented representing a K number of cores, the number of processor cores 104 implemented in the CPU 102 is a matter of design choice. As such, in other implementations, the CPU 102 can include any number of processor cores 104. The processor cores 104 execute instructions such as program code 108 for one or more applications 110 stored in the memory 106 and the CPU 102 stores information in the memory 106 such as the results of the executed instructions. The CPU 102 is also able to initiate processing by issuing one or more command packets to processing unit 128. In implementations, the CPU 102 implements multiple processor cores (not shown in FIG. 1 in the interest of clarity) that execute instructions concurrently or in parallel. An input/output (I/O) engine 126 includes hardware and software to handle input or output operations associated with the display 130, as well as other elements of the processing system 100 such as keyboards, mice, printers, external disks, and the like. The I/O engine 126 is coupled to the bus 132 so that the I/O engine 126 communicates with the memory 106, processing unit 128, or CPU 102. According to some embodiments, processing system 100 includes one or more graphics cores 114 designated to communicate with a host, driver, or both executed by CPU 102. For example, in some embodiments, one or more graphics cores 114 are configured to receive and send data from and to a host, driver, or both executed by CPU 102. According to some embodiments, the graphics core 114 designated to communicate with the host, driver, or both executed by CPU 102 is also assigned one or more command partitions 120 while in other embodiments the graphics core 114 designated to communicate with the host, driver, or both executed by CPU 102 is not assigned any command partitions 120.

Figure 2:
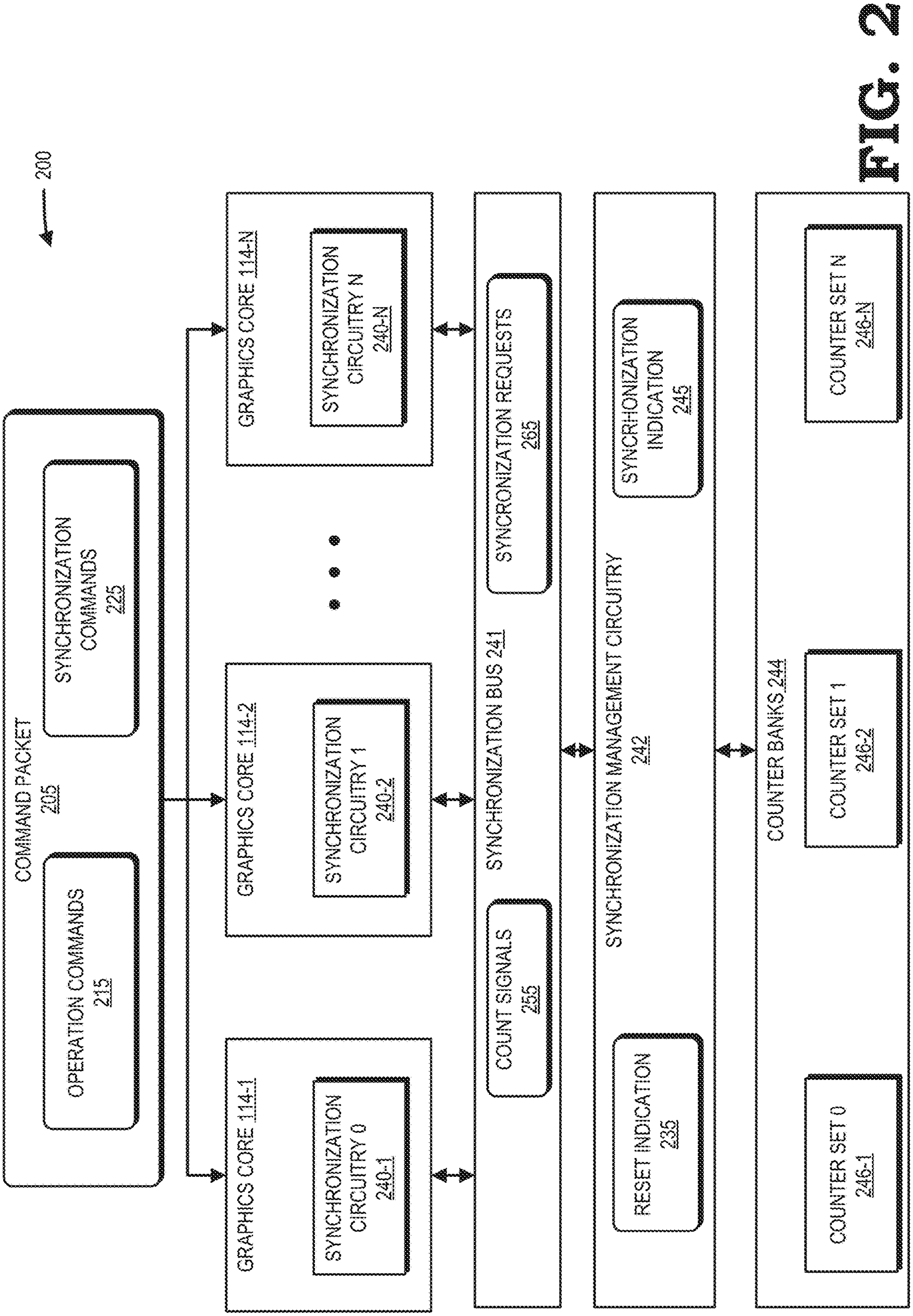
FIG. 2 is a block diagram of a processing system for synchronized processing of command partitions using centralized counter banks, in accordance with some embodiments.

Referring now to FIG. 2, an example operation 200 for synchronization between graphics cores using a global counter bank is presented, in accordance with embodiments. In embodiments, example operation 200 first includes one or more graphics cores (114-1, 114-2, 114-N) receiving the same command packet 205. A command packet 205, for example, indicates one or more commands, instructions, draw calls, or any combination thereof to be performed for one or more applications 110. In embodiments, the command packet 205 includes one or more operation commands 215, synchronization commands 225, or both. These operation commands 215, for example, represent one or more commands, instructions, draw calls, or any combination thereof to be performed for a pipeline (e.g., compute pipeline, graphics pipeline). As an example, an operation command 215 includes, a scheduling command, wait command, predication command, occlusion query, pipeline status command, stream output operation command, acquire memory command, release memory command, end-of-pipe event command, end-of-shader event command, partial flush command, draw calls, instructions, or any combination thereof associated with a pipeline. The synchronization commands 225, for example, each include instructions for a graphics core 114 to wait until one or more other graphics core 114 of the processing unit 128 are at the same point in the pipeline indicated by the command packet 205 being executed. As an example, instructions for a graphics core 114 to wait until one or more other graphics core 114 of the processing unit 128 have completed the same number of one or more certain operation commands 215 as the graphics core 114.

To enable the execution of synchronization commands 225, each graphics core 114 includes a respective synchronization circuitry (240-1, 240-2, 240-N). A synchronization circuitry 240, for example, is configured to communicate with synchronization management circuitry 242 so as synchronize the execution of commands, instructions, draw calls, or any combination thereof across two or more graphics cores 114. For example, each respective synchronization circuitry 240 is configured to communicate with synchronization management circuitry 242 via synchronization bus 241. A synchronization circuitry 240, for example, is configured to enable synchronization of the performance of one or more commands, instructions, draw calls, pipeline events (e.g., certain points in a compute pipeline or graphics pipeline), or any combination thereof between two or more graphics cores 114 by maintaining, checking, or both counter banks 244. According to embodiments, based on a graphics core 114 observing one or more commands, instructions, draw calls, or any combination thereof indicated by an operation command 215 of command packet 205, the synchronization circuitry 240 of the graphics core 114 is configured to generate a count signal 255. A count signal 255, for example, includes an indication that the graphics core 114 that generated the count signal 255 has observed one or more certain commands, instructions, draw calls, or any combination thereof. As an example, based on a graphics core 114 performing a draw call, the synchronization circuitry 240 of the graphics core 114 generates a count signal 255 indicating that the graphics core 114 has observed the draw call. That is to say, the synchronization circuitry 240 generates an indication that the graphics core 114 has observed the draw call. As another example, based on a graphics core 114 determining that a command, instruction, draw call, or any combination thereof is not associated with the command partition 120 assigned to the graphics core 114 (e.g., the graphics core 114 determines that the command, instruction, draw call, or any combination thereof is not to be performed based on the command partition 120 assigned to the graphics core 114), the synchronization circuitry 240 of the graphics core 114 generates a count signal 255 indicating that the graphics core 114 has observed the command, instruction, draw call, or any combination thereof. In this way, the synchronization circuitry 240 generates a count signal 255 each time an operation command 215 of the command packet 205 is parsed (e.g., observed).

After generating a count signal 255, the synchronization circuitry 240 provides the count signal 255 to synchronization management circuitry 242 via synchronization bus 241. Synchronization management circuitry 242, for example, is configured to maintain counter banks 244 that includes counter sets 246 each including hardware-based counters, software-based counters, or both configured to track the number of times a respective graphics core 114 has observed one or more certain commands, instructions, draw calls, pipeline events, or any combination thereof. As an example, counter banks 244 includes a first counter set 0 246-1 configured to track the number of times a first graphics core 114-1 has observed one or more certain commands, instructions, draw calls, pipeline events, or any combination thereof, a second counter set 1 246-2 configured to track the number of times a second graphics core 114-2 has observed one or more certain commands, instructions, draw calls, pipeline events, or any combination thereof, and a third counter set 2 246-3 configured to track the number of times a third graphics core 114-N has observed one or more certain commands, instructions, draw calls, pipeline events, or any combination thereof. Based on a received count signal 255, synchronization management circuitry 242 is configured to adjust (e.g., increment, reduce) one or more counters of counter banks 244. For example, synchronization management circuitry 242 is configured to increment one or more counters of a counter set 246 associated with the graphics core 114 that sent the count signal 255. According to embodiments, synchronization management circuitry 242 is configured to adjust the counters within a counter set 246 corresponding to the command, instruction, draw call, or pipeline event indicated in a received count signal 255. As an example, based on a count signal 255 indicating a first graphics core 114-1 and that the first graphics core 114-1 has observed a first command, synchronization management circuitry 242 increments the counter within counter set 0 246-1 (e.g., the counter set associated with the first graphics core 114-1) corresponding to the first command. As another example, based on a count signal 255 indicating a first graphics core 114-1 and that the first graphics core 114-1 has observed a first pipeline event (e.g., the first graphics core 114-1 is at a first point in a pipeline), synchronization management circuitry 242 increments the counter within counter set 0 246-1 (e.g., the counter set associated with the first graphics core 114-1) corresponding to the pipeline event.

According to embodiments, to perform a synchronization command 225 indicated in a command packet 205, example operation 200 first includes the synchronization circuitry 240 of a graphics core 114 pausing performance of command packet 205 and then sending a synchronization request 265 to synchronization management circuitry 242 via synchronization bus 241. A synchronization request 265, for example, includes data indicating the graphics core 114 that sent the request and data indicating one or more commands, instructions, draw calls, pipeline events, or any combination thereof tracked by counter banks 244. That is to say, a synchronization request 265 includes data requesting that synchronization management circuitry 242 alerts the graphics core 114 when one or more other graphics cores 114 are at the same point within the pipeline indicated by a command packet 205 (e.g., have observed the same number of commands, instructions, draw calls, or pipeline events indicated by the synchronization command 225). Based on the received synchronization request 265, synchronization management circuitry 242 checks one or more counters of one or more counter sets 246 corresponding to the command, instruction, draw call, or pipeline event indicated in the synchronization request 265. Based on the counter sets 246 indicating that two or more graphics cores 114 have not yet observed the same number of the commands, instructions, draw calls, or pipeline events indicated in the synchronization request 265, the synchronization management circuitry 242 waits and continues to check the counter sets 246. That is to say, the synchronization management circuitry 242 waits until the counters in two or more counter sets 246 indicate two or more graphics cores 114 have observed the same number of commands, instructions, draw calls, pipeline events, or any combination thereof indicated in a received synchronization request 265 (e.g., the counters in two or more counter sets 246 indicate two or more graphics cores 114 are at a same point in a compute or graphics pipeline). Based on the counters in two or more counter sets 246 indicating two or more graphics cores 114 have observed the same number of commands, instructions, draw calls, pipeline events or any combination thereof indicated in a received synchronization request 265, the synchronization management circuitry 242 sends a synchronization indication 245 to one or more graphics cores 114 that includes data indicating two or more graphics cores 114 are synched. After receiving a synchronization indication 245, a graphics core 114 begins execution of the next operation command 215 indicated in a graphics operation packet.

According to some embodiments, synchronization management circuitry 242 checks one or more counters of one or more counter sets 246 corresponding to the command, instruction, draw call, pr pipeline event and graphics core 114 indicated in the synchronization request 265 to determine whether one or more of the counters indicate a predetermined value. For example, in some embodiments, after one or more synchronization commands 225 are performed by a graphics core 114, synchronization management circuitry 242 sets one or more counters in a counter set 246 associated with the graphics core 114 to a predetermined value (e.g., 0). Such a predetermined value, for example, indicates that the counter has been reset. Based on one or more counters of one or more counter sets 246 being equal to a predetermined value (e.g., 0), synchronization management circuitry 242 sends a reset indication 235 to the graphics core 114 that sent a synchronization request 265. The reset indication 235, for example, indicates that the counter has been reset and that two or more graphics cores 114 are in synch (e.g., are at a same point in a pipeline indicated by the command packet). Based on receiving a reset indication 235, a graphics core 114 performs the next operation command 215 of the command packet 205.

Figure 3:
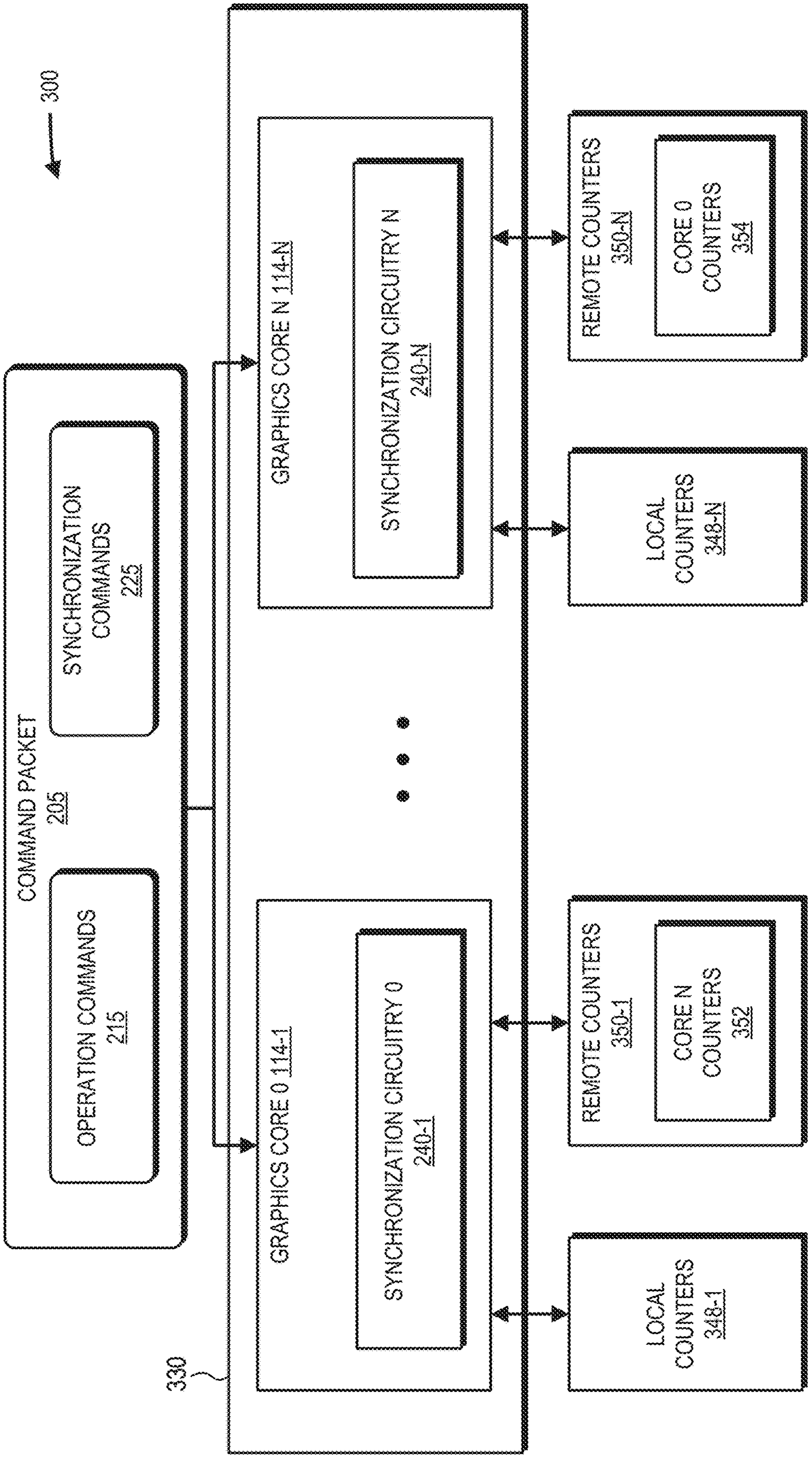
FIG. 3 is a block diagram of a processing system for synchronized processing of command partitions using local counters, in accordance with some embodiments.

Referring now to FIG. 3, an example operation 300 for synchronization between graphics cores using local counters is presented, in accordance with embodiments. In embodiments, example operation 300 first includes one or more graphics cores (114-1, 114-N) receiving the same command packet 205 that includes one or more operation commands 215 and one or more synchronization commands 225. To enable the execution of synchronization commands 225, each graphics core 114 includes a respective synchronization circuitry (240-1, 240-N) configured to maintain a respective set of counters included in or otherwise connected to the graphics core 114. For example, synchronization circuitry 0 240-1 of a first graphics core 0 114-1 is configured to maintain a first set of counters including local counters 348-1 and remote counters 350-1 and synchronization circuitry 1 240-2 of a second graphics core 1 114-N is configured to maintain a second set of counters including local counters 348-N and remote counters 350-N. The local counters 348 included in or otherwise connected to a graphics core 114 include hardware-based counters, software-based counters, or both configured to track the number of times the graphics core 114 has observed one or more certain commands, instructions, draw calls, pipeline events, or any combination thereof indicated in the command packet 205. The remote counters 350 included in or otherwise connected to a graphics core 114 include hardware-based counters, software-based counters, or both configured to track the number of times one or more other graphics cores 114 have observed one or more certain commands, instructions, draw calls, pipeline events, or any combination thereof indicated in the command packet 205. For example, remote counters 350-1 included in or otherwise connected to graphics core 0 114-1 include one or more core N counters 352 configured to track the number of times graphics core N 114-N has observed one or more certain commands, instructions, draw calls, pipeline events or any combination thereof. Likewise, for example, remote counters 350-N included in or otherwise connected to graphics core N 114-N include one or more core 0 counters 354 configured to track the number of times graphics core 0 114-1 has observed one or more certain commands, instructions, draw calls, pipeline events, or any combination thereof.

According to embodiments, based on a graphics core 114 observing one or more commands, instructions, draw calls, or any combination thereof indicated by an operation command 215 of command packet 205, the synchronization circuitry 240 of the graphics core 114 is configured to first adjust (e.g., increment, reduce) one or more corresponding local counters 348 associated with the observed commands, instructions, and draw calls. For example, based on a graphics core 114 performing one or more commands, instructions, draw calls, pipeline events, or any combination thereof indicated by a command packet 205, the synchronization circuitry 240 of the graphics core 114 is configured to increment one or more corresponding local counters 348. Further, based on a graphics core 114 determining one or more commands, instructions, draw calls, pipeline events, or any combination thereof indicated by a command packet 205 are not associated with the command partition 120 assigned to the graphics core 114, the synchronization circuitry 240 of the graphics core 114 is configured to increment one or more corresponding local counters 348. Additionally, based on a graphics core 114 observing one or more commands, instructions, draw calls, or any combination thereof indicated by an operation command 215 of command packet 205, the synchronization circuitry 240 of the graphics core 114 is configured to generate a count signal 255 indicating that the graphics core 114 has observed one or more certain commands, instructions, draw calls, or any combination thereof. After generating the count signal 255, the synchronization circuitry 240 provides the count signal 255 to one or more other graphics cores 114.

For example, according to embodiments, each graphics core 114 is connected by a data fabric 330. Such a data fabric 330, for example, includes one or more memory channels, buffers, queues, or the like configured to communicatively couple each graphics core 114 to one or more other graphics cores 114, frame buffer 228, bus 132, or any combination thereof. In embodiments, the synchronization circuitry 240 of a graphics core 114 is configured to provide a count signal 255 to another graphics core 114 via data fabric 330. In response to receiving a count signal 255 from another graphics core 114, the synchronization circuitry 240 is configured to adjust one or more counters in a set of remote counters 350 included in or otherwise connected to the graphics core 114. For example, the synchronization circuitry 240 increments one or more counters in a set of remote counters 350 corresponding to the commands, instructions, draw calls, pipeline events, or any combination thereof indicated in a count signal 255 and corresponding to the graphics core 114 that sent the count signal 255. As an example, in response to receiving a count signal 255 from graphics core N 114-N indicating the performance of a draw call, synchronization circuitry 0 240-1 of graphics core 0 114-1 increments one or more core N counters 352 in remote counters 350-1 corresponding to the draw call indicated in the count signal 255. In this way, each graphics core 114 maintains corresponding counters indicating the respective number of times each graphics core 114 has observed one or more certain commands, instructions, draw calls, pipeline events, or any combination thereof.

To perform a synchronization command 225 indicated in a command packet 205, example operation 300 first includes the synchronization circuitry 240 of a graphics core 114 pausing performance of command packet 205 and then checking the local counters 348 and remote counters 350 included in or otherwise connected to the graphics core 114. Based on the local counters 348 and remote counters 350 indicating that two or more graphics cores 114 have not yet observed the same number of the command, instruction, draw call, or pipeline event indicated in the synchronization command 225, the synchronization circuitry 240 of the graphics core 114 waits and continues to check the local counters 348 and remote counters 350. Based on the local counters 348 and remote counters 350 indicating two or more graphics cores 114 have observed the same number of commands, instructions, draw calls, pipeline events, or any combination thereof indicated in a synchronization command 225, the graphics core 114 begins execution of the next operation command 215 indicated in the command packet 205. In some embodiments, the synchronization circuitry 240 of a graphics core 114 checks one or more local counters 348 to determine whether one or more of the counters indicate a predetermined value. For example, in some embodiments, after one or more synchronization commands 225 are performed by a graphics core 114, the synchronization circuitry 240 of the graphics core 114 sets one or more counters in the local counters 348 to a predetermined value (e.g., 0). Such a predetermined value, for example, indicates that the local counter 348 has been reset. Based on one or more local counters 348 being equal to a predetermined value (e.g., 0), the graphics core 114 performs the next operation command 215 of the command packet 205.

Figure 4:
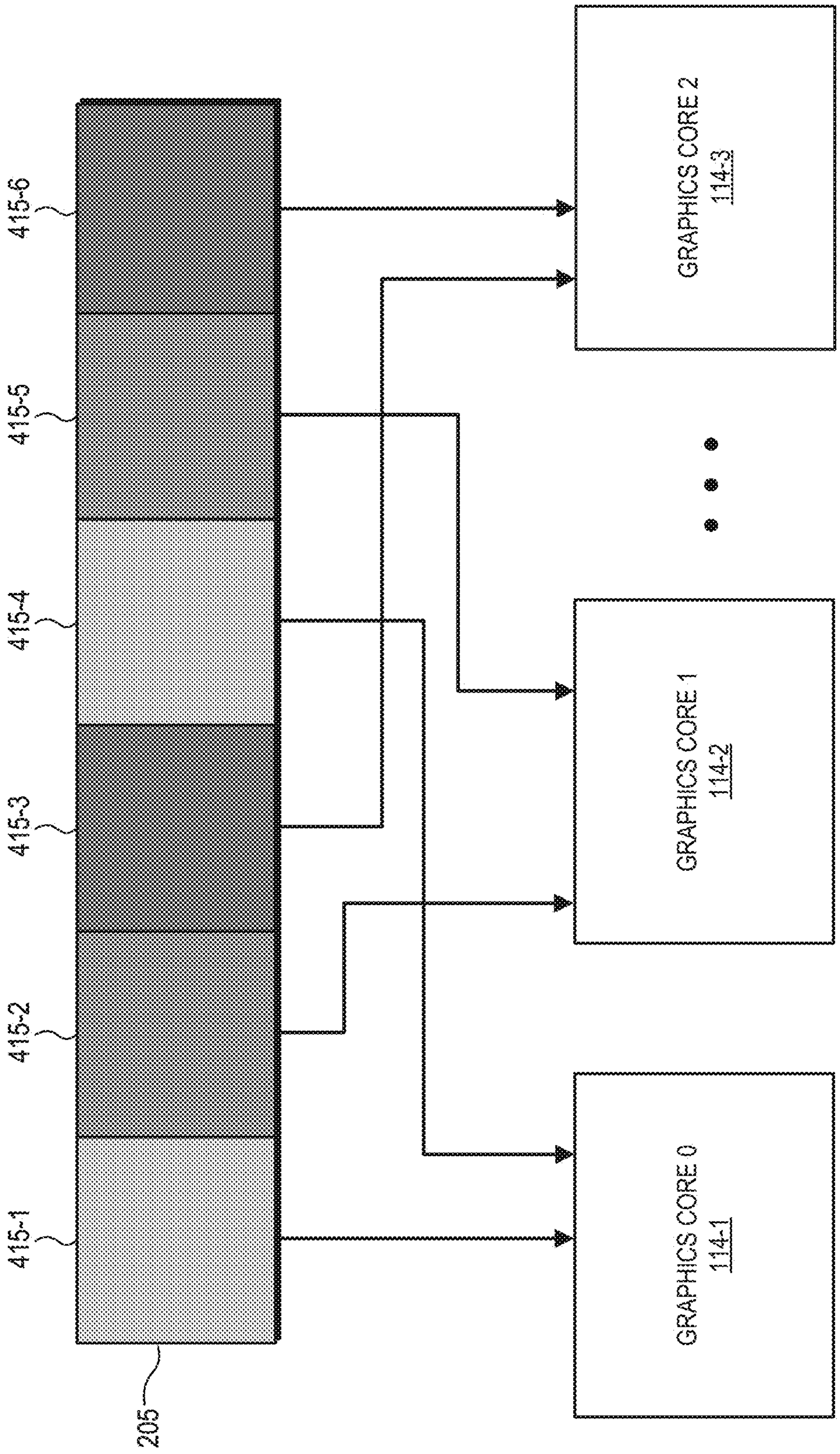
FIG. 4 is a block diagram of one or more command partitions based on a command packet, in accordance with some embodiments.

FIG. 4 one or more command partitions based on a command packet 205 is presented. In embodiments, command packet 205 includes one or more work items each including commands, instructions, draw calls, or any combination thereof to be performed. According to embodiments, processing unit 128 is configured to divide the work items of the command packet 205 into two or more partitions 415 (e.g., command partition 120). Each partition 415, for example, includes a distinct group of the work items within the command packet 205. For example, each partition 415 includes a group of one or more respective work items within command packet 205. In some embodiments, each partition 415 of command packet 205 is the same size (e.g., includes the same number of work items) while in other embodiments two or more partitions 415 include different numbers of work items. Though the example embodiment of FIG. 4 presents the work items of the command packet 205 divided into six partitions (415-1, 415-2, 415-3, 415-4, 415-5, 415-6), in other embodiments, the work items of the command packet 205 may be divided into any number of partitions.

In embodiments, processing unit 128 is configured to assign each partition 415 to a respective graphics core 114. That is to say, processing unit 128 assigns one or more partitions 415 respectively to two or more graphics cores 114. Referring to the example embodiment presented in FIG. 4, processing unit 128 assigns partitions 415-1 and 415-4 to graphics core 0 114-1, partitions 415-2 and 415-5 to graphics core 1 114-2, and partitions 415-3 and 415-6 to graphics core 2 114-3. Based on the partitions 415 assigned to the graphics core 114, each graphics core 114 is configured to execute the command packet 205. For example, each graphics core 114 only performs commands, instructions, and draw calls of the command packet 205 within the work items of the command packet 205 within the partitions 415 assigned to the graphics core. As an example, referring to FIG. 4, graphics core 0 114-1 only performs the commands, instructions, and draw calls of the command packet 205 within the work items of partition 415-1 and partition 415-4. In this way, each graphics core 114 is configured to receive and concurrently execute the same command packet 205.

Figure 5:
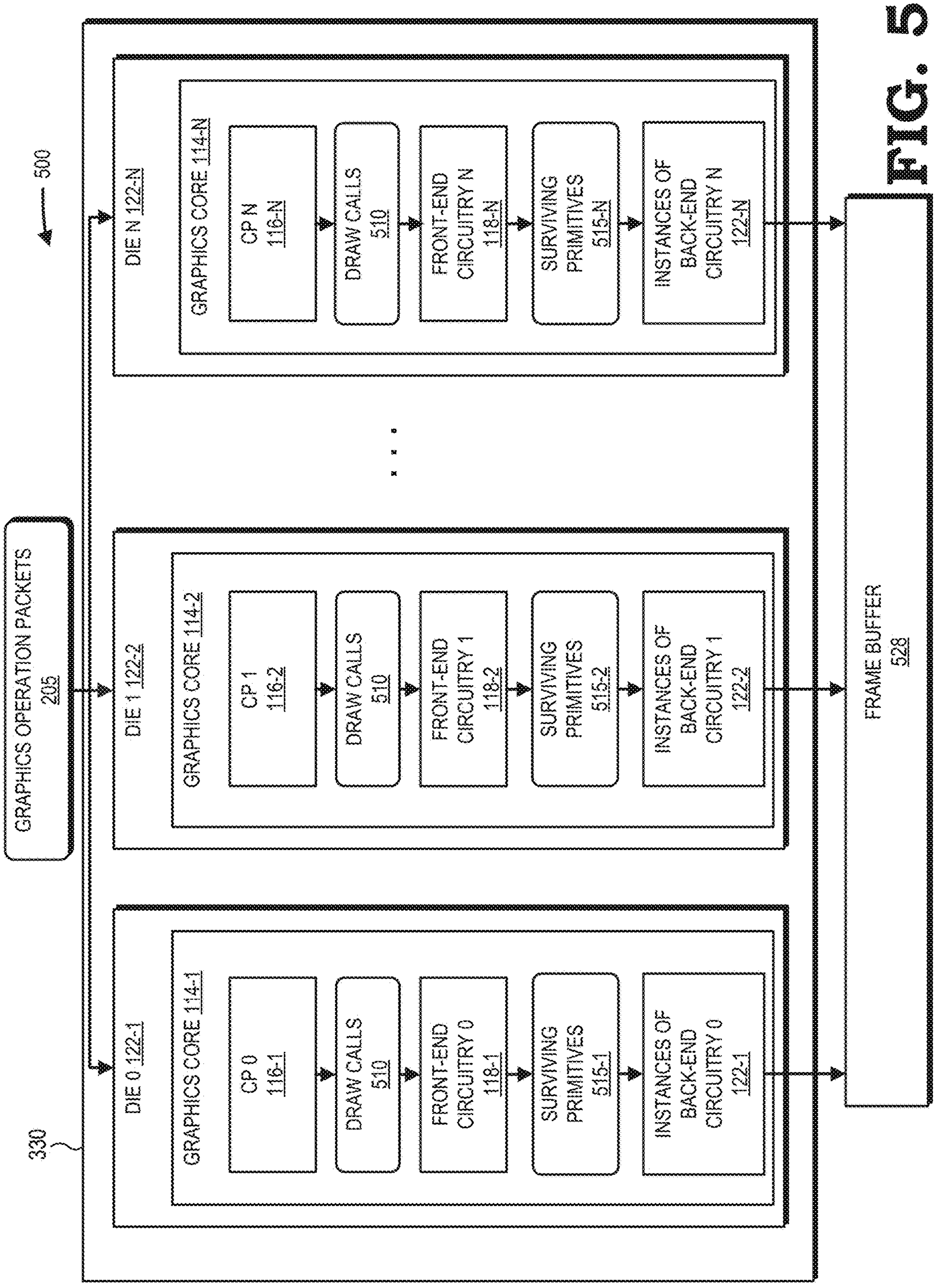
FIG. 5 is a flow diagram of an example operation for concurrent processing of command partitions including partitions of a screen space, in accordance with some embodiments.

Referring now to FIG. 5, an example operation 500 for concurrent processing of a graphics command packet using screen partitions is presented, in accordance with some embodiments. According to embodiments, each graphics core 114 of a group of graphics cores is connected by data fabric 330. In embodiments, example operation 500 first includes each graphics core 114 of a group of graphics cores receiving one or more command packets 205 from a graphics application. For example, in embodiments, CPU 102 is configured to issue the same one or more command packets 205 from a graphics application to each graphics core 114. Based on the same command packets 205, each command processor 116 of each graphics core 114 then determines a set of draw calls 510. For example, each command processor 116 identifies a set of draw calls 210 from a command packet 205. After determining the set of draw calls 510, each command processor 116 then provides the set of draw calls 510 to a respective front-end circuitry 118 (e.g., the front-end circuitry on the same graphics core 114). Referring to the example embodiment presented in FIG. 5, command processor 0 116-1 provides the set of draw calls 510 to a front-end circuitry 0 118-1, command processor 1 116-2 provides the set of draw calls 510 to a front-end circuitry 2 118-2, and command processor N 116-N provides the set of draw calls 510 to a front-end circuitry 0 118-N.

Based on the set of draw calls 510, each front-end circuitry 118 determines a set of primitives, groups of primitives (e.g., meshlets), or both. As an example, based on the set of draw calls 510, each front-end circuitry 118 performs one or more vertex shader operations, primitive assembly operations, or both to determine a set of primitives, groups of primitives, or both. For each determined primitive, sub-primitive, or both (e.g., for each primitive, sub-primitive, or both indicated by the set of draw calls 510), each front-end circuitry 118 determines whether each primitive, sub-primitive, or both is at least partially within the command partition 120 (e.g., partition of the screen space) assigned to a respective graphics core 114 (e.g., the graphics core 114 that includes the front-end circuitry 118). As an example, to determine whether a primitive is at least partially within the partition of the screen space assigned to a respective graphics core 114, the front-end circuitry performs one or more vertex shading operations, primitive assembly operations, bounding box operations, frustum operations, or any combination thereof. Once the front-end circuitry 118 has determined whether each primitive, sub-primitive, or both indicated in the set of draw calls 510 is at least partially within the partition of the screen space, the front-end circuitry 118 produces a set of surviving primitives 515 representing the primitives, groups of primitives, or both within the partition of the screen space assigned to the graphics core 114. Referring to the example embodiment of FIG. 5, graphics font-end circuitry 0 118-1 produces the set of surviving primitives 515-1, graphics font-end circuitry 1 118-2 produces the set of surviving primitives 515-2, and font-end circuitry N 118-N produces the set of surviving primitives 515-N.

In embodiments, each front-end circuitry 118 then provides commands, instructions, draw calls, or any combination thereof associated with a respective set of surviving primitives 515 to one or more corresponding instances of back-end circuitry 122 (e.g., instances of back-end circuitry 122 included in or otherwise connected to the same graphics core 114). Referring to the example embodiment of FIG. 5, graphics font-end circuitry 0 118-1 provides instructions, commands, draw calls, or any combination thereof associated with the set of surviving primitives 515-1 to a group of instances of back-end circuitry 0 122-1, graphics font-end circuitry 1 118-2 provides instructions, commands, draw calls, or any combination thereof associated with the set of surviving primitives 515-2 to a group of instances of back-end circuitry 1 122-2, and graphics font-end circuitry N 118-N provides instructions, commands, draw calls, or any combination thereof associated with the set of surviving primitives 515-N to a group of instances of back-end circuitry N 122-N. In response to receiving instructions, commands, draw calls, or any combination thereof indicating a set of surviving primitives 515, a group of instances of back-end circuitry 122 is configured to perform one or more rasterization operations, fragment shader operations, or both so as to render the primitives, groups of primitives, or both indicated in the set of surviving primitives 515. The group of instances of back-end circuitry 122 then stores the rendered primitives and groups of primitives (e.g., pixel values) in a frame buffer 228.

Figure 6:
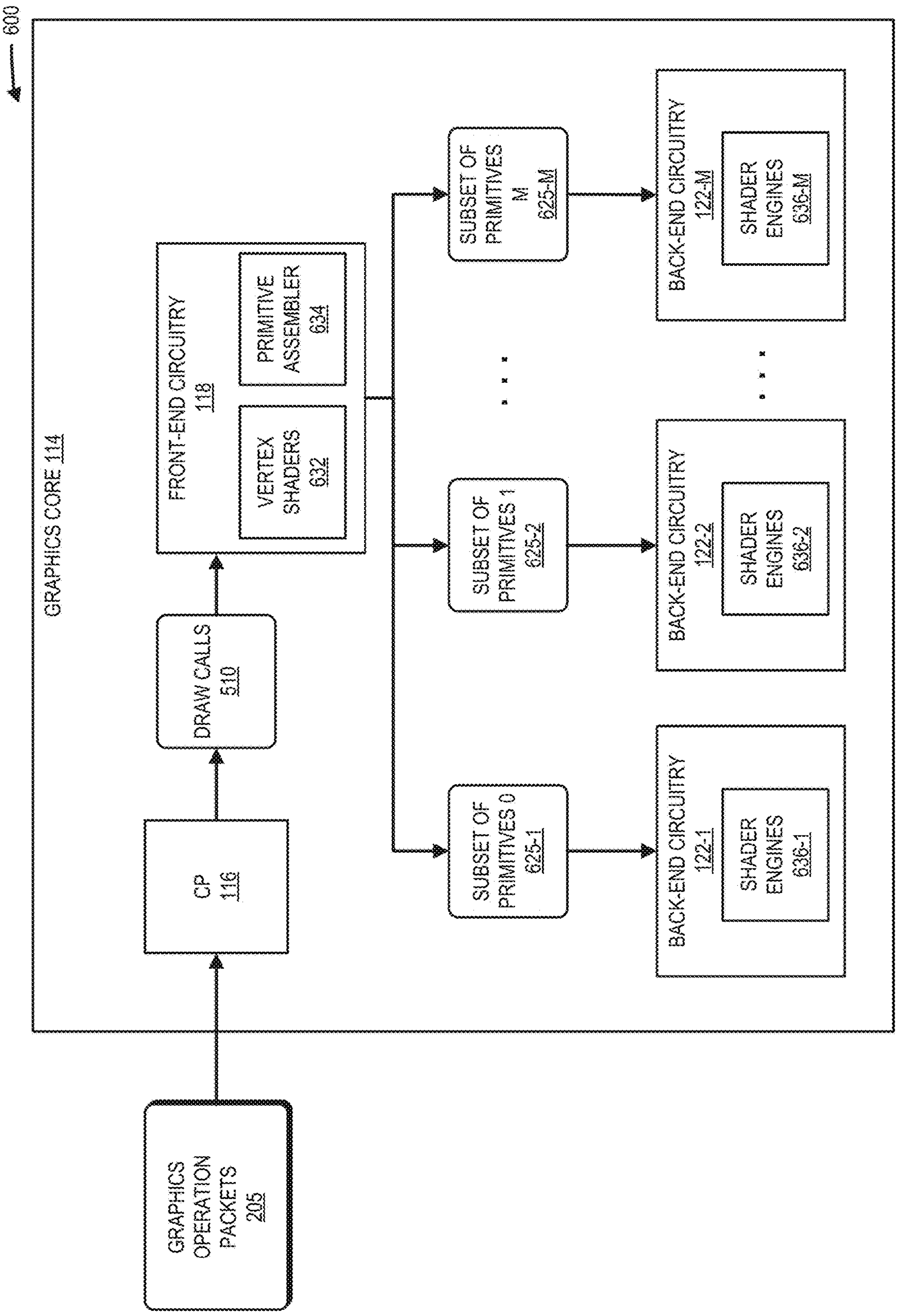
FIG. 6 is a flow diagram of an example operation for processing graphics commands based on a command partition, in accordance with some embodiments.

Referring now to FIG. 6, an example operation 300 for processing draw calls for a screen partition within a graphics core is presented, in accordance with some embodiments. According to embodiments, example operation 300 first includes the command processor 116 of a graphics core 114 receiving one or more command packets 205 from a graphics application. The command processor 116 then determines a set of draw calls 510 from the command packets 205 and provides the set of draw calls 510 to front-end circuitry 118. According to embodiments, to determine a set of primitives from the set of draw calls 510, front-end circuitry 118 includes one or more vertex shaders 632 and a primitive assembler 634. Such vertex shaders 632, for example, include circuitry configured to perform one or more vertex shading operations, for example, one or more transformation operations, skinning operations, morphing operations, per-vertex lighting operations, or any combination thereof, to name a few to generate vertex data. The primitive assembler 634, for example, includes circuitry configured to generate a set of primitives based on the determined vertex data. As an example, based on the set of draw calls 510, vertex shaders 632 first perform one or more vertex shading operations to determine vertex data for the primitives indicated in the set of draw calls 510. Using the vertex data, the primitive assembler 334 then generates a set of primitives.

After determining the set of primitives, front-end circuitry 118 then determines which primitives, groups of primitives, or both of the set of primitives are at least partially within the portion of the screen space (e.g., command partition 120) assigned to the graphics core 114. Based on the primitives, groups of primitives, or both at least partially within the partition of the screen space assigned to the graphics core 114, front-end circuitry 118 generates a set of surviving primitives 515 representing the primitives, groups of primitives, or both within the partition of the screen space assigned to the graphics core 114. Front-end circuitry 118 is configured to then divide the set of surviving primitives 515 based on the command sub-partitions 124 (e.g., sub-partitions of the screen space) assigned to each instance of back-end circuitry 122 included in or otherwise connected to the graphics core 114. As an example, front-end circuitry 118 compares the primitives and groups of primitives indicated in the set of surviving primitives 515 to each command sub-partition 124 assigned to an instance of back-end circuitry 122 included in or otherwise connected to the graphics core 114. That is to say, front-end circuitry 118 determines whether the primitives, groups of primitives, or both indicated in the set of surviving primitives 515 are at least partially within each command sub-partition 124 assigned to an instance of back-end circuitry 122 included in or otherwise connected to the graphics core 114. Based on the comparison of the primitives, groups of primitives, or both indicated in the set of surviving primitives 515 to each command sub-partition 124, the front-end circuitry 118 determines a respective subset of primitives 625 for each instance of back-end circuitry 122. Each subset of primitives 625, for example, indicate the primitives, groups of primitives, or both of the set of surviving primitives 515 at least partially within a respective command sub-partition 124 assigned to a corresponding instance of back-end circuitry 122. The front-end circuitry 118 then provides one or more commands, instructions, draw calls, or any combination thereof indicating the primitives, groups of primitives, or both within a subset of primitives 625 to a respective instance of back-end circuitry 122.

Referring to the example embodiment presented in FIG. 6, front-end circuitry 118 provides commands, instructions, draw calls, or any combination thereof associated with a first subset of primitives 0 625-1 to a first instance of back-end circuitry 122-1, commands, instructions, draw calls, or any combination thereof associated with a second subset of primitives 1 625-2 to a second instance of back-end circuitry 122-2, and commands, instructions, draw calls, or any combination thereof associated with a third subset of primitives M 625-M to a third instance of back-end circuitry 122-M. To perform the received commands, instructions, and draw calls, each instance of back-end circuitry 122 includes one or more shader engines (e.g., 636-1, 636-2, 636-M). A shader engine 636, for example, includes circuitry configured to perform one or more rasterization operations, fragment shader operations, verted shading operations, geometry processing, or any combination thereof to render one or more primitives. For example, based on commands, instructions, draw calls, or any combination thereof associated with a respective subset of primitives 625, a shader engine 636 performs one or more one or more rasterization operations, fragment shader operations, or both to render the primitives, groups of primitives, or both indicated in the subset of primitives 625. After rendering one or more primitives, groups of primitives, or both, each instance of back-end circuitry 122 stores data representing the primitives and groups of primitives (e.g., pixel values) in the frame buffer 528. In this way, each graphics core 114 is configured to support multiple instances of back-end circuitry 122 and further sub-partitioning of the screen space.

Figure 7:
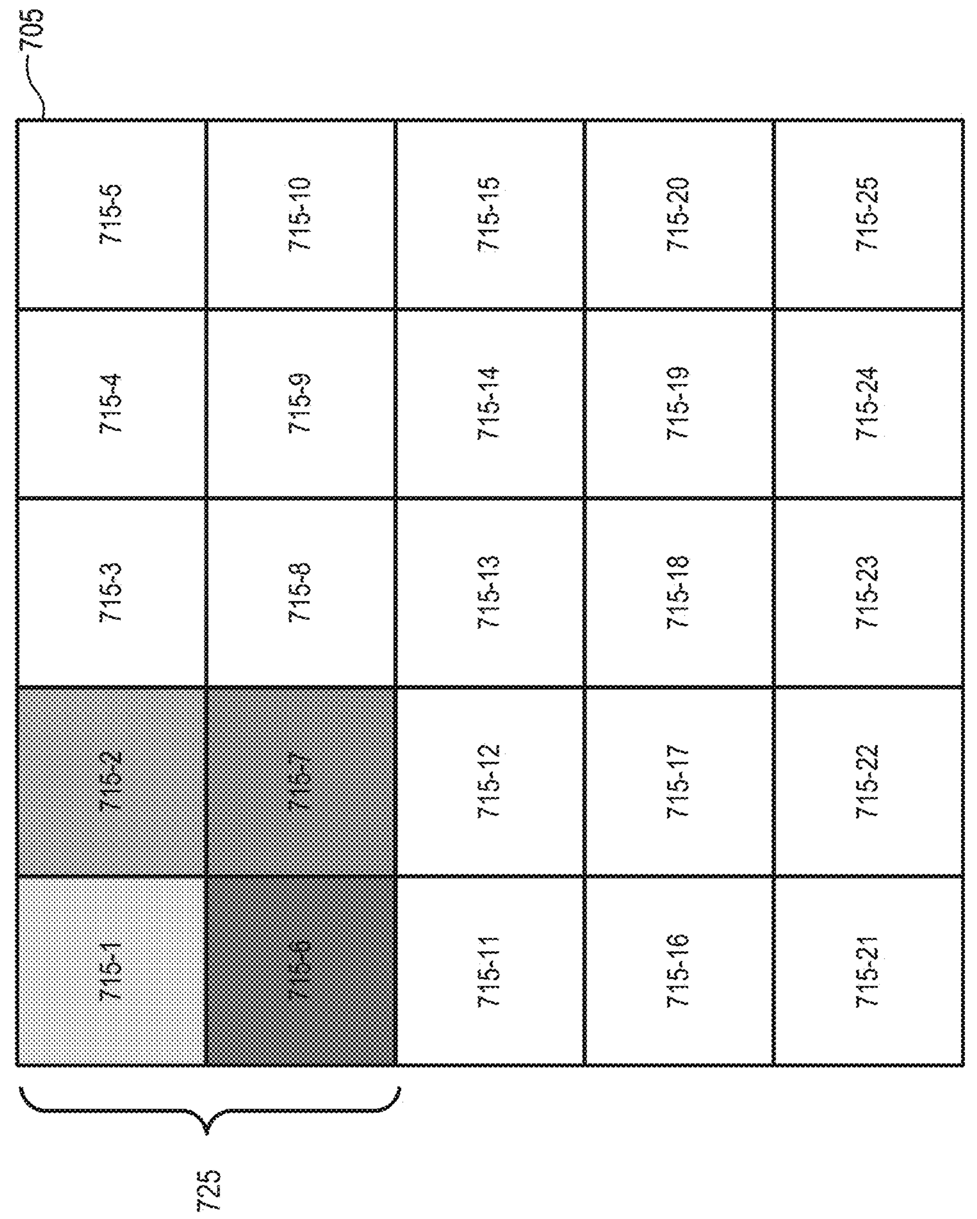
FIG. 7 is a block diagram of an example screen space having one or more command partitions, in accordance with some embodiments.

Referring now to FIG. 7, example screen space 705 having a partition is presented. In embodiments, example screen space 705 includes a number of sub-partitions (e.g., command sub-partitions 124) each including a first number of pixels of example screen space 705 in a first (e.g., horizontal) direction and a second number of pixels of example screen space 705 in a second (e.g., vertical) direction. Though the example embodiment of FIG. 7 presents example screen space 705 as having 25 sub-partitions (715-1, 715-2, 715-3, 715-4, 715-5, 715-6, 715-7, 715-8, 715-9, 715-10, 715-11, 715-12, 715-13, 715-14, 715-15, 715-16, 715-17, 715-18, 715-19, 715-20, 715-21, 715-22, 715-23, 715-24, 715-35), in other embodiments, example screen space 705 can have any number of sub-partitions 715. According to embodiments, each sub-partition 715 is assigned to a respective instance of back-end circuitry 122 of one or more graphics cores 114. Additionally, in some embodiments, two or more sub-partitions 715 of example screen space 705 form a partition 725 (e.g., command partition 120) of example screen space 705 assigned to a corresponding graphics core 114. To this end, each sub-partition 715 forming a partition 725 of example screen space 705 is assigned to an instance of back-end circuitry 122 included in or otherwise connected to the graphics core 114 assigned to the partition 725.

For example, referring to FIG. 7, a partition 725 is formed from sub-partitions 715-1, 715-2, 715-6, and 715-7. In some embodiments, the partition 725 is assigned to a first graphics core 114 of processing unit 128. Based on partition 725 being assigned to the first graphics core 114, sub-partition 715-1 is assigned to a first instance of back-end circuitry 122 included in or otherwise connected to the first graphics core 114 (indicated as a first level of shading in FIG. 7). Further, sub-partition 715-2 is assigned to a second instance of back-end circuitry 122 included in or otherwise connected to the first graphics core 114 (indicated as a second level of shading darker than the first level of shading in FIG. 7). Sub-partition 715-7 is assigned to a third instance of back-end circuitry 122 included in or otherwise connected to the first graphics core 114 (indicated as a third level of shading darker than the second level of shading in FIG. 7). Additionally, sub-partition 715-6 is assigned to a fourth instance of back-end circuitry 122 included in or otherwise connected to the first graphics core 114 (indicated as a fourth level of shading darker than the third level of shading in FIG. 7). Because each sub-partition 715 forming a partition 725 is assigned to a respective instance of back-end circuitry 122 included in or otherwise connected to the graphics core 114 assigned to the partition 725, a single graphics core 114 is enabled to support each partition 725 and associated sub-partitions 715 which reduces the processing demands on the graphics cores and increases processing efficiency.

Figure 8:
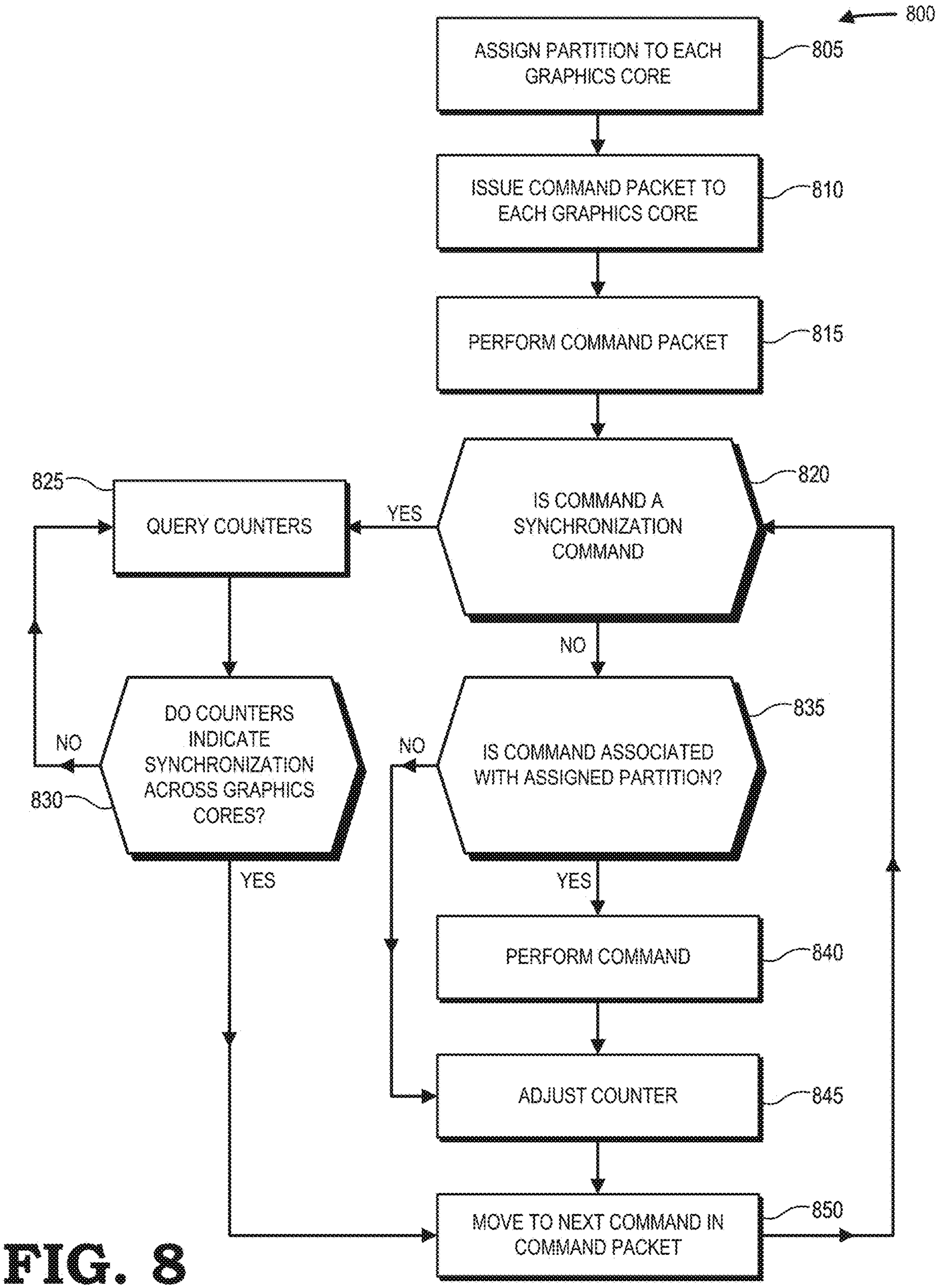
FIG. 8 is a flow diagram of an example method for concurrent processing of command partitions, in accordance with some embodiments.

Referring now to FIG. 8, an example method 800 for concurrent processing of a command packet by two or more graphics cores is presented, in accordance with embodiments. In embodiments, example method 800 first includes, at block 805, processing unit 128 diving the work items of a command packet 205 into two or more command partitions 120. For example, in some embodiments, processing unit 128 divides the work items of command packet 205 into one or more partitions 415 each including one or more work items of command packet 205 with each partition 415 representing a command partition 120. In other embodiments, processing unit 128 divides a screen space (e.g., screen space 705) into two or more partitions 725 with each partition 725 representing a command partition 120. After determining one or more command partitions 120, processing unit 128 assigns each command partition 120 to a respective graphics core 114. According to some embodiments, processing unit 128 is configured to divide each command partition 120 (e.g., partition 725 of the screen space) into two or more command sub-partitions 124 (e.g., sub-partition 715). As an example, for a command partition 120 representing a partition of the screen space, each command sub-partition 124 of the command partition 120 includes a distinct portion of the command partition 120. Processing unit 128 then assigns each command sub-partition 124 to a respective instance of back-end circuitry 122 included in or otherwise connected to the graphics core 114 assigned to the command partition 120.

At block 810 of example method 800, each graphics core 114 is configured to receive the same command packet 205 indicating the same set of operation commands 215 and synchronization commands 225. For example, the command processor 116 of each graphics core 114 receives the same command packet 205 packet from a compute application including the same set of commands to be performed. As another example, the command processor 116 of each graphics core 114 receives the same command packet 205 packet from a graphics application including the same set of draw calls to be performed. After receiving the command packet 205, at block 815, each graphics core performs the commands, instructions, draw calls, or any combination thereof indicated in the command packet 205. To this end, at block 820, the front-end circuitry 118 of each graphics core 114 first determines whether a first command, instruction, or draw call indicated in the command packet 205 is a synchronization command 225. Based on the first command not being a synchronization command 225, the graphics core 114 moves to block 835. At block 835, the front-end circuitry 118 determines whether the command, instruction, draw call, or any combination thereof is associated with a command partition 120 assigned to the graphics core 114. For example, based on the command packet 205 being from a compute application, the front-end circuitry 118 determines whether the command, instruction, draw call, or any combination thereof is in a work item of command packet 205 within a partition 415 assigned to the graphics core 114. As another example, based on the command packet 205 being from a graphics application, the front-end circuitry 118 determines whether the command, instruction, draw call, or any combination thereof indicates one or more primitives, groups of primitives, or both at least partially with one or more partitions 725 of a screen space assigned to the graphics core 114.

In response to the command, instruction, draw call, or any combination thereof being associated with a command partition 120 assigned to the graphics core 114, the graphics core 114 moves to block 840. As an example, in response to the command, instruction, draw call, or any combination thereof being in a work item of command packet 205 within a partition 415 assigned to the graphics core 114, the graphics core 114 moves to block 840. As another example, in response to the command, instruction, draw call, or any combination thereof indicating one or more primitives, groups of primitives, or both at least partially within one or more partitions 725 of a screen space assigned to the graphics core 114, the graphics core 114 moves to block 840. At block 840, the graphics core 114 performs the command, instruction, draw call, or any combination thereof indicated in the command packet 205. For example, the front-end circuitry 118 performs one or more commands, instructions, operations, or any combination thereof as indicated by the command, instruction, or draw call. As another example, the front-end circuitry 118 distributes one or more commands, instructions, draw calls, or any combination thereof to one or more instances of back-end circuitry 122.

Once the graphics core 114 has performed the command, instruction, or draw call, the graphics core 114 adjusts (e.g., increments, reduces) one or more counters (e.g., counter set 246, local counter 348). As an example, in some embodiments, the graphics core 114 generates a count signal 255 indicating the graphics core 114 has observed the command, instruction, or draw call and provides the count signal 255 to synchronization management circuitry 242. Synchronization management circuitry 242 then adjusts one or more counters in a counter set 246 associated with the graphics core 114 to indicate the observance of the command, instruction, or draw call. As another example, the graphics core 114 first increments one or more local counters 348 included in or otherwise connected to the graphics core 114 to indicate the observance of the command, instruction, or draw call. Further, the graphics core 114 provides a count signal 255 to one or more other graphics cores 114 that indicates the observance of the command, instruction, or draw call by the graphics core 114. In response to receiving the count signal 255, a graphics core 114 is configured to adjust one or more remote counters 350 included in or otherwise connected to the graphics core 114 so as to indicate the observance of the command, instruction, or draw call by the graphics core 114 that sent the count signal 255. Referring again to block 835, in response to the command, instruction, draw call, or any combination thereof not being associated with a command partition 120 assigned to the graphics core 114, the graphics core 114 moves to block 845 and adjusts one or more counters. As an example, in response to the command, instruction, draw call, or any combination thereof being in a work item of command packet 205 not within a partition 415 assigned to the graphics core 114, the graphics core 114 moves to block 845. As another example, in response to the command, instruction, draw call, or any combination thereof not indicating one or more primitives, groups of primitives, or both at least partially within one or more partitions 725 of a screen space assigned to the graphics core 114, the graphics core 114 moves to block 845.

After adjusting one or more counters, at block 850, the graphics core 114 moves to a next command, instruction, or draw call indicated in the command packet 205. Referring again to block 820, in response to the command, instruction, or draw call indicated in the command packet 205 being a synchronization command 225, the graphics core 114 moves to block 825. At block 825, the graphics core 114 suspends execution of the command packet 205 and queries one or more counters to determine whether one or more other graphics cores 114 have completed the same number of commands, instructions, draw calls, or any combination thereof indicated in the synchronization command 225 as the graphics core 114. That is to say, the graphics core 114 determines whether one or more other graphics cores 114 are at the same point in a pipeline (e.g., compute pipeline, graphics pipeline) indicated by the command packet 205. As an example, in some embodiments, the graphics core 114 queries one or more local counters 348, remote counters 350, or both included in or otherwise connected to the graphics core 114. In other embodiments, the graphics core 114 queries one or more counter sets 246 in counter banks 244.

At block 830, the graphics core 114 determines whether the queried counters indicate that one or more other graphics cores 114 have observed the same number of commands, instructions, draw calls, or any combination thereof indicated in the synchronization command 225 as the graphics core 114. In other words, the graphics core 114 determines if the counters indicate that the graphics core 114 is synchronized with one or more other graphics cores 114 (e.g., is at a same point in a pipeline indicated by the command packet 205 as one or more other graphics cores 114). Based on the counters not indicating that one or more other graphics cores 114 have observed the same number of commands, instructions, draw calls, or any combination thereof indicated in the synchronization command 225 as the graphics core 114, the graphics core 114 continues to suspend execution of the command packet 205 and moves to block 825. Based on the counters indicating that one or more other graphics cores 114 have observed the same number of commands, instructions, draw calls, or any combination thereof indicated in the synchronization command 225 as the graphics core 114, the graphics core 114 moves to the next command, instruction or draw call indicated in the command packet 205 at block 850.

In some embodiments, the apparatus and techniques described above are implemented in a system including one or more integrated circuit (IC) devices (also referred to as integrated circuit packages or microchips), such as the graphics cores described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing unit, comprising:

a plurality of graphics cores each assigned to a respective command partition, wherein each graphics core of the plurality of graphics cores is configured to:

receive a same command packet indicating one or more instructions, wherein the same command packet is received by each graphics core of the plurality of graphics cores;

identify, from the same command packet, a set of instructions associated with the respective command partition of the graphics core; and in response to performing the set of instructions associated with the respective command partition of the graphics core, provide an indication the graphics core has observed the set of instructions.

2. The processing unit of claim 1, wherein each graphics core of the plurality of graphics cores is configured to: identify, from the same command packet, one or more work items associated with the respective command partition of the graphics core.

3. The processing unit of claim 2, wherein each graphics core of the plurality of graphics cores is configured to identify, from the same command packet, the set of instructions associated with the respective command partition of the graphics core based on whether the set of instructions is within the one or more work items associated with the respective command partition of the graphics core.

4. The processing unit of claim 1, wherein the respective command partition of a corresponding graphics core of the plurality of graphics cores is associated with a respective partition of a screen space.

5. The processing unit of claim 4, wherein each graphics core of the plurality of graphics cores is configured to identify the set of instructions associated with the respective command partition of the graphics core based on whether the set of instructions indicates one or more primitives within the respective partition of the screen space associated with the respective command partition of the graphics core.

6. The processing unit of claim 1, wherein each graphics core of the plurality of graphics cores is configured to, in response to performing the set of instructions associated with the respective command partition of the graphics core, provide a count signal to one or more other graphics cores of the plurality of graphics cores.

7. The processing unit of claim 1, wherein each graphics core of the plurality of graphics cores is configured to determine synchronization with one or more other graphics cores of the plurality of graphics cores by querying one or more counters associated with the one or more other graphics cores of the plurality of graphics cores.

8. A method, comprising:

receiving, at each graphics core of a plurality of graphics cores, a same command packet indicating sets of instructions, wherein each graphics core of the plurality of graphics cores is assigned to a respective command partition;

identifying, each graphics core of the plurality of graphics cores, a corresponding set of instructions in the same command packet associated with the respective command partition of the graphics core; and in response to performing, at a graphics core of the plurality of graphics cores, the corresponding set of instructions associated with the respective command partition associated with the graphics core, providing an indication the graphics core has observed the corresponding set of instructions.

9. The method of claim 8, wherein identifying, by each graphics cores of the plurality of graphics cores, the corresponding set of instruction in the same command packet includes identifying, from the same command packet, one or more corresponding work items associated with the respective command partition of the graphics core.

10. The method of claim 9, further comprising:

identifying, by each graphics core of a plurality of graphics cores, the corresponding set of instructions based on whether the corresponding set of instructions is within the one or more corresponding work items associated with the respective command partition of the graphics core.

11. The method of claim 8, wherein the respective command partition of a corresponding graphics core is associated with a respective partition of a screen space.

12. The method of claim 11 further comprising:

identifying, at each graphics core of a plurality of graphics cores, the corresponding set of instructions based on whether the corresponding set of instructions indicates one or more primitives within the respective partition of the screen space associated with the respective command partition of the graphics core.

13. The method of claim 8, further comprising:

in response to performing, at the graphics core of the plurality of graphics cores, the corresponding set of instructions associated with the respective command partition of the graphics core, providing a count signal to one or more other graphics cores of the plurality of graphics cores.

14. The method of claim 8, further comprising:

determining, at the graphics core of the plurality of graphics cores, synchronization with one or more other graphics cores of the plurality of graphics cores by querying one or more counters associated with the one or more other graphics cores.

* * * * *